UNITED STATES PATENT OFFICE.

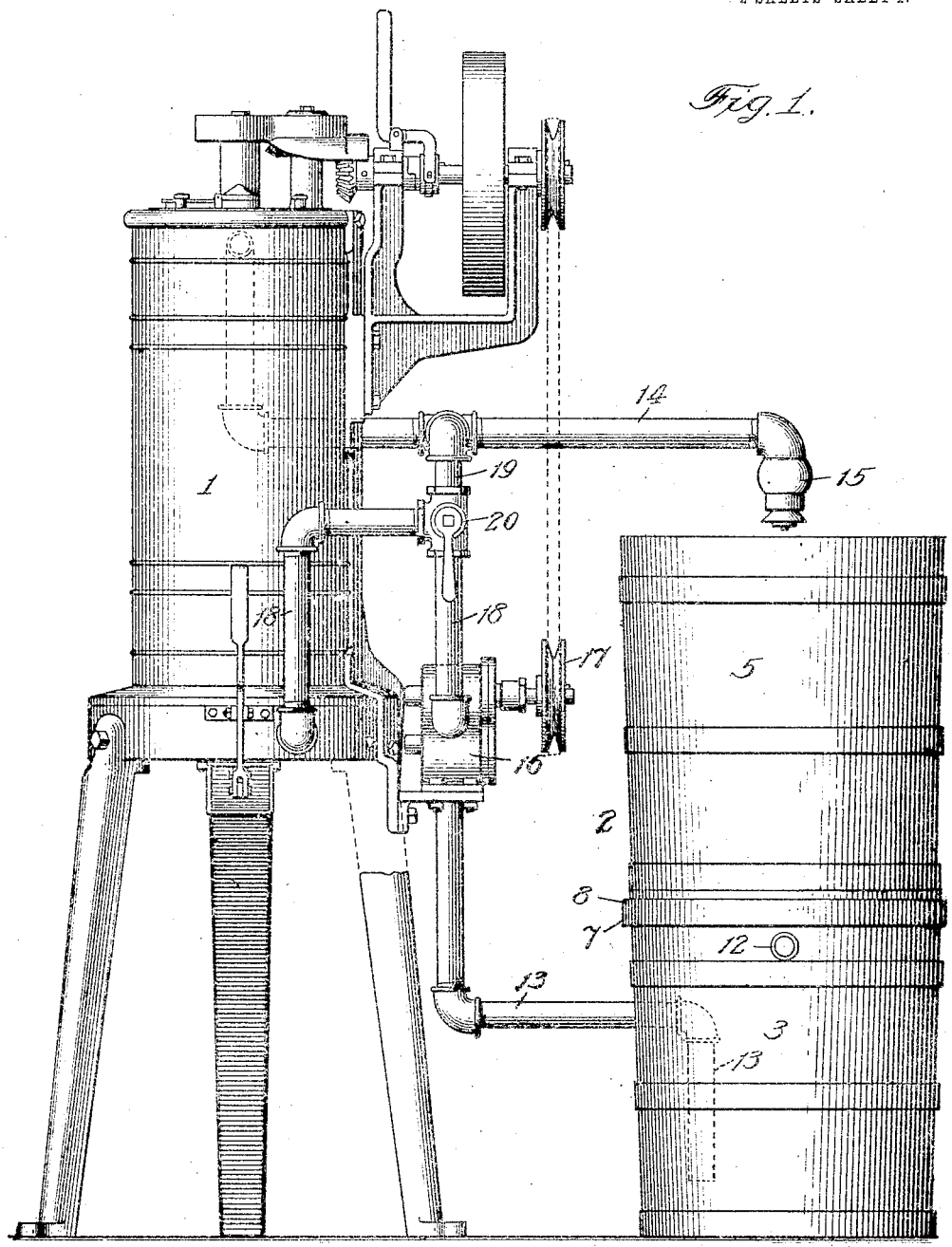

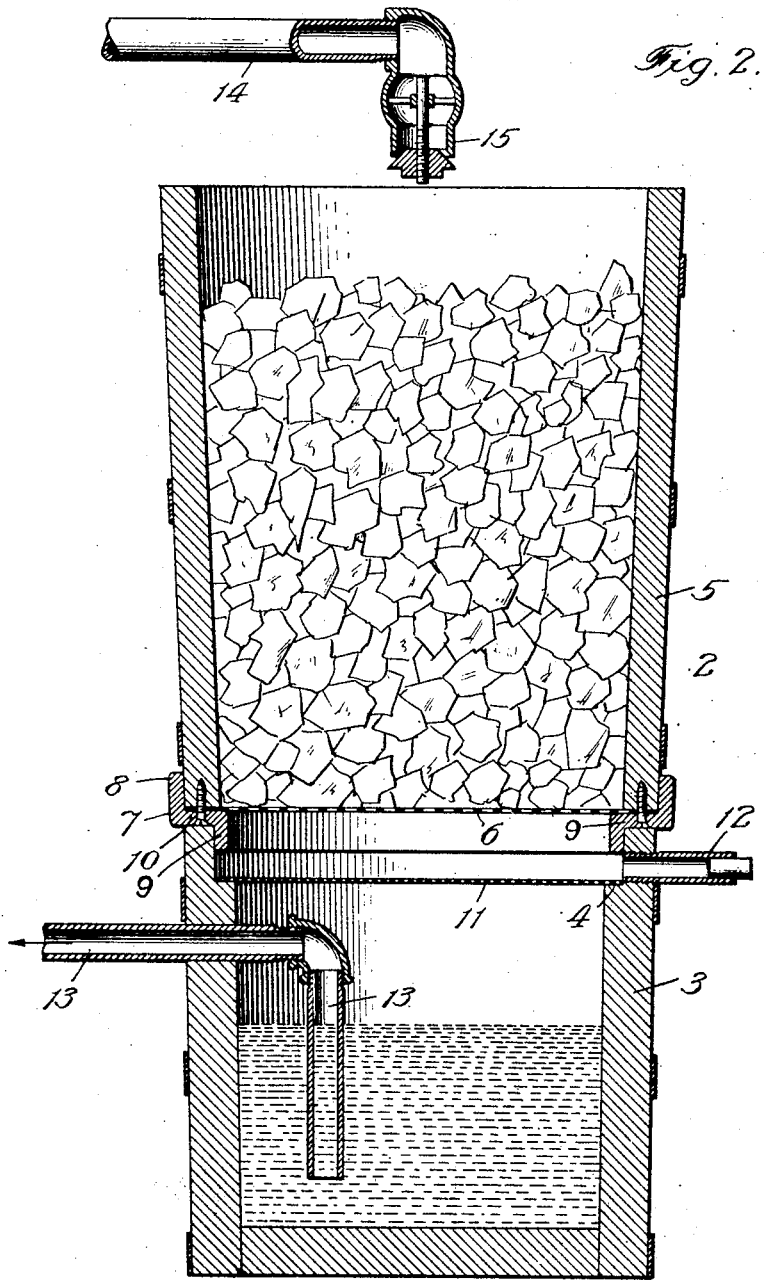

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

FREEZING APPARATUS.

1,039,655.

Specification of Letters Patent. Patented Sept. 24, 1912.

Application filed February 7, 1912. Serial No. 676,142.

*To all whom it may concern:*

Be it known that I, GEORGE F. DICKSON, a citizen of the United States of America, and a resident of Chicago, in the county of Cook, State of Illinois, have invented certain new and useful Improvements in Freezing Apparatus, of which the following is a specification.

This invention relates to that class of freezing apparatus in which the brine or like cooling fluid in its return from the refrigerating chamber of the apparatus is sprayed over a mass of broken ice to remove the heat which it acquired in its passage through the refrigerating chamber, and an example of which forms the subject matter of my prior Patent No. 931,687, dated August 17, 1909. And the present improvement has for its object to provide a simple and efficient structural formation of the apparatus whereby the various portions of the brine tub or vessel can be readily separated for cleaning purposes, and again reassembled for use, all as will hereinafter more fully appear.

In the accompanying drawings:—Figure 1, is a side elevation illustrating the general arrangement of parts in an ice-cream freezing apparatus to which the present improvement is applied. Fig. 2, is a vertical section of the brine cooling means or tub of the present invention.

Similar reference numerals indicate like parts in both views.

Referring to the drawings, 1 represents a freezer adapted for the production of ice-cream, and preferably of the form shown and which is described in detail in my companion application for a patent, Serial Number 676,141 filed Feby. 7, 1912. The same comprising in the main an inner freezing chamber for the cream and an outer annular refrigerating or cooling chamber through which the cooled brine is made to circulate.

2 is the brine cooling tub or vessel arranged adjacent to the freezer 1, and in a plane below the same, so that the circulation of the brine between the described parts will be aided by gravity. In the present improvement said brine cooling tub 2 will comprise a detail formation and arrangement of parts as follows:—3 is an open top lower tray or member, the upper margin of which is recessed to form an inner annular shoulder 4 for the attachment and support of the parts hereinafter described. 5 is an open top vertical shell superimposed upon the lower tray 3 and provided at its lower end with a foraminous bottom 6, held in place in the manner hereinafter described. The shell 5 is adapted to contain the mass of broken ice used in the process of freezing, while the foraminous bottom 6 is adapted to retain the broken ice in place and at the same time permit the free passage of the brine into the brine receiving chamber of the lower tray 3, aforesaid. 7 is a hoop encircling the lower end of the vertical shell 5 and formed with an outer upwardly projecting flange 8, and an inner downwardly projecting flange 9, said flanges being connected together by a horizontal web 10, as shown. The lower end of the vertical shell 5 and the margin of the foraminous bottom 6 are adapted to fit into the annular recess formed by the aforesaid outer flange 8 and web 10, and the parts are secured together by screws as shown, or by other usual fastening means. The inner flange 9 is adapted to fit the annular recess at the top margin of the lower tray 3 and provides a substantial and readily detachable connection between the described members of the tub.

11 is a foraminous strainer plate resting on the annular shoulder 4 of the tray 3, and adapted to retain any mechanical impurities and scum that may pass downward with the brine.

12 is a lateral drain pipe or neck opening through the wall of the tray 3 above the strainer plate 12 for the removal of the aforesaid impurities.

13 is an outlet pipe connected with the interior of the tray 3 and adapted to take its supply of brine from the bottom of the same.

14 is a brine return pipe extending from the upper end of the refrigerating chamber of the freezer 1, to a point above the brine cooling tub 2, and having a downturned spraying head 15 of any usual construction, and by which the returning brine is sprayed down upon the mass of broken ice contained in the upper shell 5 of the cooling tub 2.

16 is a brine circulating pump, preferably of the rotary type shown, and having a driving shaft and pulley 17 operatively connected to a suitable power source. The inlet end of said pump is connected to and receives its supply of brine from the outlet pipe 13 of the lower tray 3 above described.

18 is a pipe extending from the outlet of the pump 16 to the lower end of the refrigerating chamber of the freezer 1 above referred to, and adapted to convey the cooled brine from the bottom of the tray 3 to the lower end of said refrigerating chamber.

19 is a branch pipe connecting the pump outlet pipe 18 with the brine return pipe 14 aforesaid.

20 is a three-way valve arranged at the point of connection of the aforesaid pipes 18 and 19, and adapted to direct the flow of the cooled brine to the refrigerating chamber of the freezer 1, or to the brine return pipe 14 directly, at different stages of the operation. The last mentioned control is intended for use in starting up the apparatus and where the brine has not attained the required low temperature, and such control is adapted to afford a short path for the brine from the tray 3 to the mass of broken ice arranged above said tray in the shell 5, to attain the required low temperature in the brine.

Having thus fully described my said invention what I claim as new and desire to secure by Letters Patent, is:—

1. In a freezing apparatus of the type herein described, a brine cooling tub comprising a lower open top tray formed with an annular shoulder in its upper margin, a strainer plate resting upon said shoulder, and an upper shell formed with a foraminous bottom fitting within the upper margin of the tray above said strainer plate, substantially as set forth.

2. In a freezing apparatus of the type herein described, a brine cooling tub comprising a lower open top tray formed with an annular shoulder in its upper margin, a strainer plate resting upon said shoulder, an upper shell having a foraminous bottom, and a hoop encircling the bottom of said shell and formed with an outer upwardly projecting flange, an inner downwardly projecting flange fitting within the upper margin of the tray and a horizontal web connecting said flanges, substantially as set forth.

Signed at Chicago, Illinois, this 1st day of February 1912.

GEORGE F. DICKSON.

Witnesses:
ROBERT BURNS,
HENRY MOE.